United States Patent [19]

Orkin et al.

[11] Patent Number: 4,983,240
[45] Date of Patent: Jan. 8, 1991

[54] METHOD OF MAKING A FLANGED BRAIDED BEARING

[75] Inventors: Stanley S. Orkin, Vernon; Craig L. Carlson, Granby; David B. Rowlands, Simsbury, all of Conn.

[73] Assignee: Kamatics Corporation, Bloomfield, Conn.

[21] Appl. No.: 344,493

[22] Filed: Apr. 26, 1989

Related U.S. Application Data

[63] Continuation of Ser. No. 95,757, Sep. 11, 1987, abandoned.

[51] Int. Cl.⁵ .......................... B29C 67/12; D04C 1/00
[52] U.S. Cl. .......................................... 156/148; 87/1; 87/7; 87/11; 264/103; 264/258
[58] Field of Search ................ 156/148, 149, 393, 441; 87/1, 7, 8, 9, 11, 23, 34, 35; 264/103, 258, 257; 384/275, 295–300, 907.1, 908, 909, 911

[56] References Cited

U.S. PATENT DOCUMENTS

| | | | |
|---|---|---|---|
| 1,640,543 | 8/1927 | Gudge | 264/258 |
| 2,128,087 | 8/1938 | Gatke | 384/298 |
| 2,614,058 | 10/1952 | Francis | 156/175 |
| 3,007,497 | 11/1961 | Shobert | 156/149 |
| 3,030,248 | 4/1962 | Runton | 384/297 |
| 3,096,560 | 8/1963 | Liebig | 28/72 |
| 3,131,979 | 5/1964 | Shobert | 384/298 |
| 3,586,058 | 6/1971 | Ahrens et al. | 138/103 |
| 3,864,197 | 2/1975 | Shobert | 156/148 |
| 3,873,168 | 3/1975 | Viola et al. | 384/298 |
| 3,964,807 | 6/1976 | White | 156/174 |
| 3,981,223 | 9/1976 | Ostermann | 87/50 |
| 4,003,290 | 1/1977 | Haehnel et al. | 87/57 |
| 4,034,642 | 7/1977 | Iannucci et al. | 87/48 |
| 4,034,643 | 7/1977 | Iannucci | 87/48 |
| 4,040,883 | 8/1977 | Matt et al. | 87/1 |
| 4,084,479 | 4/1978 | Ratera | 87/48 |
| 4,092,897 | 6/1978 | Lalikos | 87/29 |
| 4,130,046 | 12/1978 | Sokol | 87/48 |
| 4,158,984 | 6/1979 | Griffiths | 87/8 |
| 4,161,903 | 7/1979 | Sokol | 87/57 |
| 4,228,207 | 10/1980 | Porte et al. | 428/80 |
| 4,260,143 | 4/1981 | Kliger | 267/148 |
| 4,266,461 | 5/1981 | Molitors | 87/29 |
| 4,275,638 | 6/1981 | DeYoung | 87/48 |
| 4,292,879 | 10/1981 | Kokubun | 87/57 |
| 4,372,191 | 2/1983 | Iannucci | 87/48 |
| 4,380,483 | 4/1983 | Kliger | 156/245 |
| 4,704,918 | 11/1987 | Orkin et al. | 464/183 |
| 4,734,146 | 3/1988 | Halcomb et al. | 156/148 |
| 4,846,908 | 7/1989 | Aldrich et al. | 156/148 |
| 4,865,792 | 9/1989 | Moyer | 264/257 |

Primary Examiner—Michael W. Ball
Assistant Examiner—Steven D. Maki
Attorney, Agent, or Firm—McCormick, Paulding & Huber

[57] ABSTRACT

A flanged bearing includes a layer of woven braid which is continuous throughout a sleeve and a flange portions thereof, with at least one braid strand substantially parallel to a bearing axis. The sleeve may be cylindrical in shape and the flange portion washer shaped, and the braid may include carbon fiber strands impregnated with a polyimide resin so that the bushing is lightweight and self-lubricating at high temperatures.

5 Claims, 3 Drawing Sheets

METHOD OF MAKING A FLANGED BRAIDED BEARING

This is a continuation of co-pending application Ser. No. 95,757 filed on Sept. 11, 1987, abandoned.

TECHNICAL FIELD

The invention relates generally to bearings and deals more particularly with braided bearings having an integrally connected flange.

BACKGROUND OF THE INVENTION

Bearings embodying the present invention may be used in aircraft, for example, to guide control shafts for jet engine vanes because such bearings are light-weight and may be selflubricating. Such bearings also may be used in a marine environment, with hinges of doors of military landing crafts or ships, and latching mechanism for watertight doors because such bearings are resistant to salt water. In any application of a bearing embodying the present invention, the bearing may be exposed to rotational, oscillatory, or reciprocal stresses or a combination of such stresses transmitted by an associated shaft or other part.

An example of a flanged bearing is disclosed in Runton U.S. Pat. No. 3,030,248, and takes the form of a washer punched or cut from a sheet of fabric. Another bearing of the same general type is disclosed in Gatke U.S. Pat. No. 2,128,087, to Gatke, and takes the form of a cylindrical bushing made by rolling a sheet of fabric or coiling a strip of fabric into the shape of a cylinder. However, either mode of construction disclosed in '087 leaves an undesirable seam. Although it is possible to bond the cylindrical bushing of '087 to the washer of '248 by epoxy to make a flanged bushing, the epoxy bond is not strong or durable enough for some applications.

Another way to make a flanged bushing is to begin with an elongated cylindrical journal bushing of the type discussed in '087 and then make longitudinal cuts in an end portion of the cylinder to form strips which remain attached at one end to the remainder of the cylinder. Then these strips may be bent radially outward, and rigidified in the radial position with a thermosetting, thermoplastic or other type resin. However, this process takes several steps, and the bushing's flange strength is reduced by cuts in the fiber, resulting in discontinuous fibers connecting the flange to the cylindrical journal.

A flanged, cylindrical, fluid or electrical conduit comprising braided fibers and a hardened resin polyimide is disclosed in Ahrens U.S. Pat. No. 3,586,058, as well as the method for making the conduit. The Ahrens patent is not directed towards bearing technology and, therefore, provides no guidance as to the type of fiber, fiber configuration, resin selection or selection of any other parameters which would be useful in bearing design. A shaped, braided hollow body having a varying cross-section is described in U.S. Pat. No. 4,228,207.

Other types of bearings used in aircraft and marine environments consist of powdered carbon which has been compressed into a hollow, cylindrical shape and encased in an outer metal jacket. The jacket may also include a collar or flange used to position the cylindrical body in a housing and absorb axial loads or thrusts. There are often hundreds of bushings in a jet engine, and these carbon type bushings have an appreciable size and weight in the aircraft in which they are used. Also, it is not uncommon for such a metal encased carbon bearing to come loose from its housing, in which case the bearing may be moved relative to the housing by frictional forces transmitted by an associated shaft, and wear the housing because of the metal jacket.

SUMMARY OF THE INVENTION

Accordingly, it is an object of the present invention to provide fibrous bearings having an integral flange.

A more specific object of the present invention is to provide a flanged bearing assembly including a fibrous bushing formed by continuous fibers having a cylindrical hollow body and an integrally connected flange.

Another object of the present invention is to provide a flanged, braided bearing which is self-lubricating at high temperatures.

Still another object of the present invention is to provide a flanged, braided bearing having at least one strand which is aligned substantially parallel to a longitudinal axis of the bearing.

Another object of the present invention is to provide bearings of the foregoing types which are lightweight and durable.

Another object of the present invention is to provide a multilayered braided bearing having a flange formed by an outwardly displaced portion of the braid layers.

According to the present invention, a bushing for use as a bearing to guide an associated first part for movement and relative to a second part includes a hollow portion that has a longitudinal axis and that has inner and outer surfaces adapted to receive the first and second parts, respectively. A flanged portion which is integral and continuous with the hollow portion is formed to extend outwardly from a hollow outer surface. Both the hollow portion and the flanged portion are formed from a braid layer woven with at least one strand substantially parallel to the longitudinal axis. Also included is a means for rigidifying the woven braid.

According to another aspect of the present invention, a method for making a flanged bearing includes the steps of weaving a plurality of strands over a mandrel forming a continuously woven braid layer with at least one of the strands substantially parallel to a woven braid longitudinal axis. The mandrel has a first portion which extends outward beyond a second portion. Also included is the step of applying a means for rigidifying the woven braid to form a bearing preform and configuring the bearing preform into a bearing.

According to still another aspect of the present invention, a method for making a flanged bearing includes the steps of weaving a plurality of strands to form continuous first and second woven braid layers that are concentric about a longitudinal axis. The braid layers are woven with no strands or at least one of the strands substantially parallel to the woven braid longitudinal axis and such that the first and second woven braid layers are continuous at a peripheral edge thereof. Also included in the present method is the step of forming a flange at the braid layer peripheral edge with the flange extending outwardly from the woven braid layers, and the step of applying a means for rigidifying the woven braid to form a bearing preform. A further step is configuring the bearing preform into a bearing.

DETAILED DESCRIPTION OF THE PREFERRED EMBODIMENT

Figure 1:
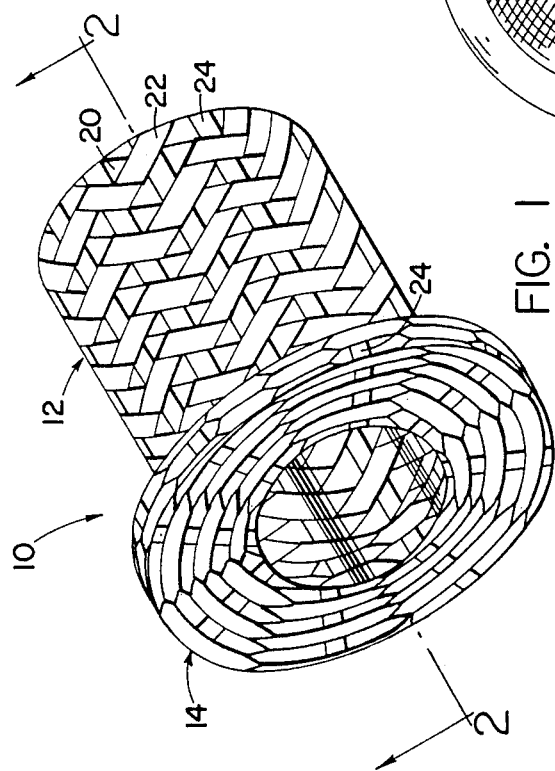
FIG. 1 is a perspective view of a flanged bushing type bearing embodying the present invention.
Figure 2:
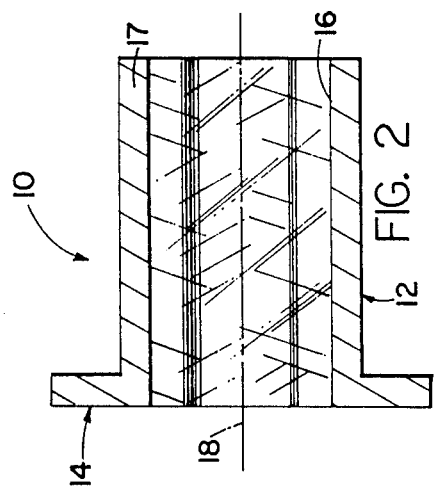
FIG. 2 is a sectional view of the flanged bushing of FIG. 1.

FIGS. 1 and 2 show a plain, flanged bushing type bearing 10 embodying the present invention. The bushing 10 includes a hollow, cylindrical journal portion or sleeve 12 and an integral, radially extending, flange portion 14 at one end of the sleeve. The bushing 10 may be used to guide a shaft which is rotating, oscillating, reciprocating or otherwise moving within the bushing 10 in contact with an inner surface 16.

As detailed hereinafter, the bushing comprises a plurality of strands woven together into a braid forming a braid layer 17 with strands woven either at an angle or parallel to a longitudinal bearing axis 18. Each strand comprises a plurality of individual fibers or filaments. In the FIG. 1 embodiment, strands 20 and 22 are disposed at an angle with respect to axis 18, while strand 24 remains substantially parallel thereto. As detailed hereinafter, a bearing provided according to the present invention is characterized b strands which maintain their relative orientation, even when finally configured in a flanged portion. Therefore, in FIG. 1, strand 24 continues through the flanged portion 14 with substantially the same relationship to strand 20 and 22 as it had in the cylindrical journal portion. In the embodiment described with respect to FIG. 1, the flange portion extends outwardly from the axis 18 by approximated 90° so that strand 24 extends radially from the axis and yet is still substantially parallel thereto. For purposes for illustration, the number of externally visible axial strands has been exaggerated.

There are many possible materials from which to make the braid and many possible resins; the choice thereof depends, at least in part, on the conditions in which the bearing will be utilized. For example, if the bushing 10 will be used at temperatures in the range of 400° to 725° F., graphite strands may be used and the resin may comprise a polyimide substance. Such a combination of strands and resin is strong, durable and self-lubricating under high temperature conditions, as are typical within an operating jet engine.

However, if the bushing 10 will be used in a marine environment, a strand may comprise fiberglass, polyester, Teflon or Kevlar, a product of E. I. duPont Company. For other operating environments, the strands may comprise nylon, cotton, ceramic, metallic braid, flax or other material, and the resin may be made of polyester, epoxy, or other thermosetting or thermoplastic material For certain applications the strands may be selected from known materials already impregnated with resin (prepreg). Those skilled in the art will note that the number of fibers comprising an individual strand is selected based on the application of the bearing.

For a high temperature application, a flanged bushing 10 may be used in conjunction with a shaft made of a variety of materials also durable at high temperatures, such as Inconel, a metal commonly used in the aircraft industry, or titanium coated with electroless nickel. The titanium is ordinarily coated with nickel, at least for parts which are commonly subject to friction, such as a shaft, because titanium alone wears when exposed to such forces. A flanged bearing provided according to the present invention is suitable for aircraft applications because it is lightweight, strong, and thin-walled and is compatible with other composite elements.

Figure 3:
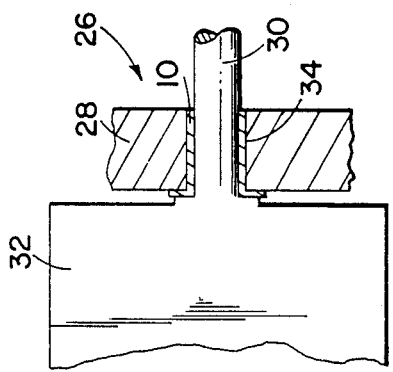
FIG. 3 is a sectional view of a bearing assembly embodying the invention, which assembly comprises the flanged bushing of FIG. 1 embedded in a housing and engaged by a shaft.

FIG. 3 shows a bearing assembly generally designated 26 comprising the bushing 10 situated in a housing 28 and in receipt of a shaft 30, the shaft being connected to a jet engine vane 32. The flange provides a bearing surface for a related abutting part, such as the vane 32. The bushing 10 may be received by or attached to the housing in a variety of ways. For example, in the illustrated embodiment, the vane bears on an outer surface of the flange 14 so the bushing may be loosely fit in a bore 34 in the housing. However, if desired, the bushing 10 may be further secured to the housing by an appropriate adhesive applied between the flange and the housing. Instead of or in addition to the adhesive, the bushing 10 may be pressed into the housing and secured by means of an interference fit. Alternatively, it is possible to key the bushing into the housing.

Shafts in general exert axial forces or thrust on a bushing even if it is intended that the shaft only rotate, oscillate or otherwise circularly move within the bushing. Therefore, it is possible for the bushing 10, as well as many other types of bushings, to come loose within their respective housings even if the bushing was originally pressed into the bore, secured by adhesive, or by the weight of another object bearing on the flange 14, and rotate or oscillate within the housing due to frictional forces exerted by a rotating or oscillating shaft. Also, if the longitudinal position of the flange 14 is not fixed by such an object, it is possible for the bushing 10 to come loose and reciprocate within the housing. Fortunately, under such conditions where the bushing 10 is moved in any manner within the housing, the bushing 10 may cause less wear on the housing than would a bushing having a metal jacket, especially if the strand and resin material of the bushing 10 are self-lubricating.

Figure 4:
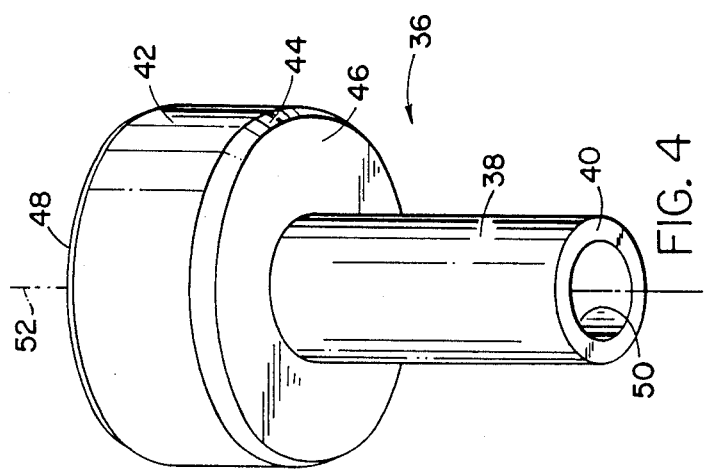
FIG. 4 is a perspective view of a mandrel used to form the bushing of FIG. 1.

Referring now to FIG. 4, there is illustrated in section a braiding mandrel 36, which includes a cylindrical shank portion 38 having bottom end surface 40 and a cylindrical shoulder portion 42 attached at the end of the shank portion opposite the end surface 40, the shoulder 42 being broader than the shank and having a bevel 44. The shoulder includes a flat end surface 46 extending radially outward from the shank, and another end surface 48 which other end surface may be involved in the braiding process. The mandrel serves as an armature upon which to weave the individual strands or bundles and includes an aperture 50 for receiving a rod (not shown) which rod is used to move the mandrel during the braiding process, the mandrel being removed in a subsequent fabrication step by means of a mold release agent, such as silicon applied to the surface of the mandrel.

A bushing provided according to the present invention comprises a plurality of strands woven both at an angle to a longitudinal axis 52 of the mandrel and strands parallel to that axis. As woven, the individual strands maintain their geometric relationships as the woven braids encompass the shank 38 and shoulder 42 of the mandrel illustrated in FIG. 6. Longitudinal or axial strands provide additional strength to the bushing along the longitudinal axis and substantially increase the strength of the bushing at the junction of the flange and sleeve. Therefore, the strength of the bushing flange is considerably increased over known braided bearings.

Figure 5:
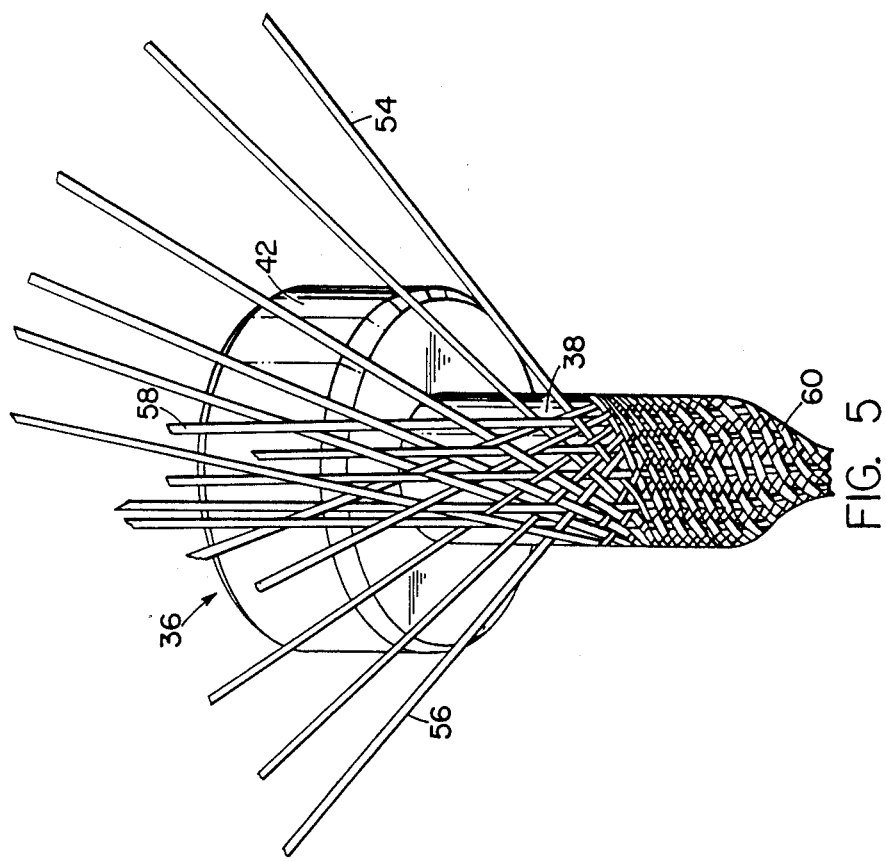
FIG. 5 diagrammatically show a braid progressively being woven onto the mandrel of FIG. 4.

FIG. 5 diagrammatically shows strands progressively being woven onto the mandrel 36, and based on the orientation of the mandrel, each braid is woven upwardly. Any one of the various well known braiding or weaving techniques, such as described in U.S. Pat. Nos. 3,552,884 and 3,553,987 to Williams can be utilized to weave the braids of the present invention. As described in the Williams patents, spools of fiber are arranged on at least one ring around a mandrel and strands leads of the fibers, such as the crossing strands 54 and 56 and axial strand 58 are woven to form a braid layer 60.

Figure 7:
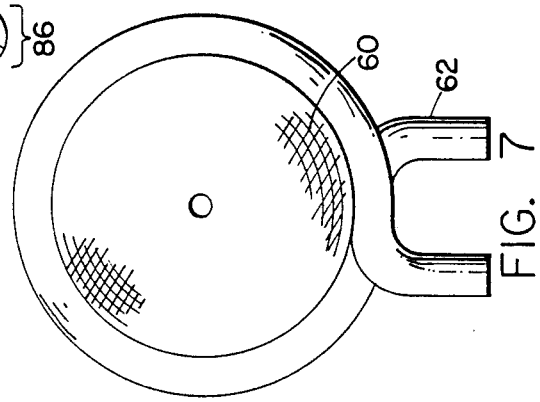
FIGS. 6 and 7 diagrammatically show the braid of FIG. 5 woven completely onto the mandrel of FIG. 4 and clamped.
Figure 6:
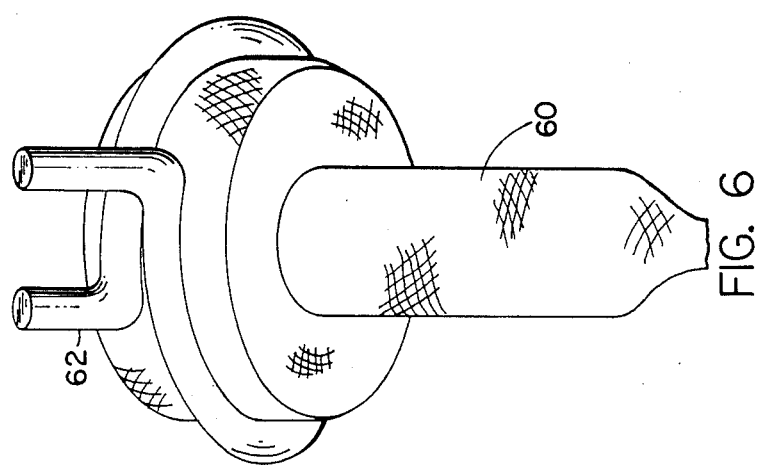

The bottom end 40 of the shank of the mandrel is inserted into the braid layer, and the weaving may be continued longitudinally to cover the shank as shown in FIG. 6, continued radially outward to cover the end surface of the shoulder and continued longitudinally upward to ultimately cover at least a portion of the cylindrical surface of the shoulder with a layer of woven braid. In a preferred embodiment, it is not necessary to completely cover the cylindrical surface or to cover the end surface with a woven braid because the flange 14 is ultimately produced from only a portion thereof. As shown in FIGS. 6 and 7, the woven braid layer 60 is clamped by a ring 62 onto the shoulder.

If the illustrated braiding process is continued longitudinally to completely cover the cylindrical surface of the shoulder and then continued radially inward to cover at portion of the end surface as shown in FIGS. 6 and 7 the woven braid covering the shank and the end surface may effectively retain their shape until the clamping ring is applied. Furthermore, with the complete covering of braid on the cylindrical surface and a covering on much of the end surface, the braid may be cut above the end surface, and a resin applied to the braid and cured with or without utilizing the clamping ring. Those skilled in the art will note that the woven braid may be folded back upon itself in a conventional manner and continued forming an additional layer of braid.

After the weaving process has been completed the woven braid must be resin impregnated. For the illustrated embodiment, the woven braid layer is clamped, cut above the shoulder, and impregnated with resin. If a polyimide resin has been used, the resin impregnated braid and mandrel are subjected to a "B-stage" process to produce a preform whereby the resin impregnated braid is force dried for fifteen minutes each at 200°, 250°, and 275° F. The resin is cured by heating the resin impregnated braid above 400° F. at 2,000 psi of pressure in a press to debulk the preform and cause the resin impregnated braid to rigidify. The preform is cut near the peripheries of the end surfaces of the mandrel and the ring and the excess braid is removed. Subsequently, the rigidified braid preform is post cured for approximately three hours. The rigidified braid is machined at the peripheries of the end surfaces to form the bottom of the sleeve 12 and the outer periphery of the flange 14, respectively.

Another process which may be followed to form a flanged hollow body is disclosed in '058 to Ahrens, which issued on 22 June 1971, is assigned to McDonnell Douglas Corporation, and is hereby incorporated by reference as part of the present disclosure. There, a flanged conduit is formed by first weaving a braid over a mandrel having a cylindrical shank and detachable, conically-shaped head. Then, this head is replaced with a flat head which abuts and flattens the portion of the braid which was previously formed over the conical head, and a resin is applied to the braid to stiffen it.

If the process described hereinabove is utilized to form a bushing, the dimensions of the cylindrical portion 12 and the flange 14 may be controlled by providing a braiding mandrel with corresponding shank and shoulder dimensions, and because the cylindrical body 12 of the bushing 10 comprises a braid, the cylindrical body 12 may have virtually unlimited length possible. Moreover, with a bearing provided according to the present invention, the bearing journal to flange dimensional aspect ratios are greatly increased, due to the strengthened journal to flange interface.

Figure 8:
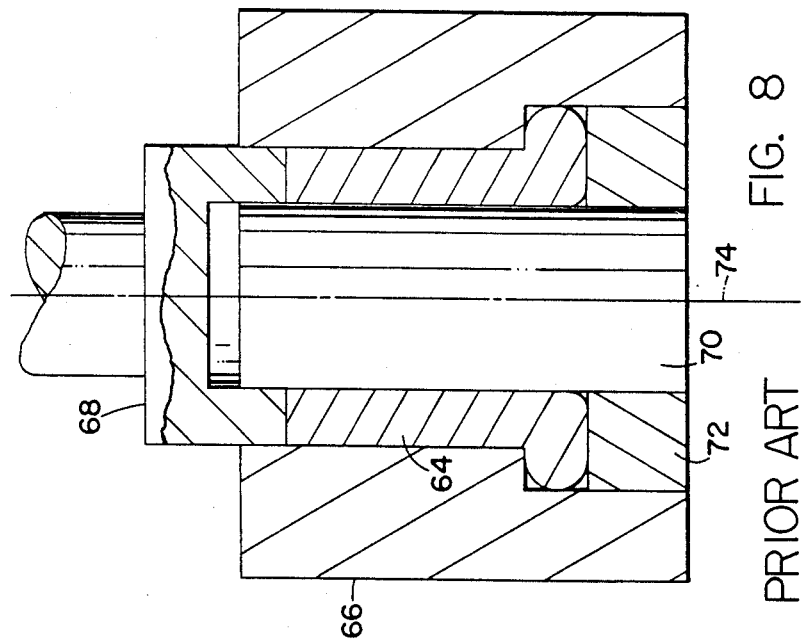
FIG. 8 is a simplified sectional view of a portion of an apparatus used in pressing bushings of the prior art.

In contrast, FIG. 8 illustrates, in section, a bushing preform 64 which is pressed in an apparatus 66 having a ram portion 68, a center pin 70 and a central plug portion 72. To form the flange the ram exerts pressure along a longitudinal axis 74 of the preform displacing a portion of the preform radially outward. However, by simply displacing one end of the hollow preform portion, there will be no strands which maintain relative alignment at the interface between the flange and hollow portions. This is true even if the braid layer is woven with a plurality of axial strands. During the process of displacing the single braid layer, the alignment of all strands, including any axial strands is disturbed, crossing one another and otherwise becoming random in orientation.

Figure 9:
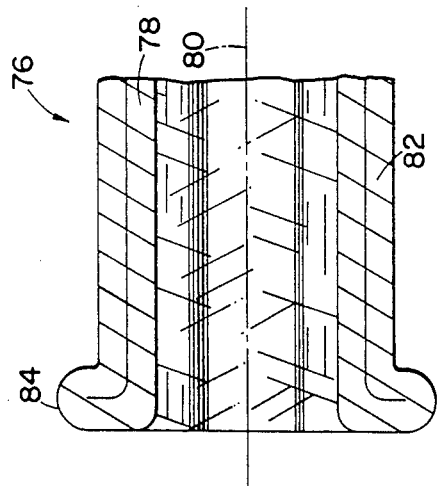
FIG. 9 is a sectional illustration of a portion of an alternative embodiment of the bearing of FIG. 1.

FIG. 9 is a sectional illustration of an alternative embodiment 76 of the bushing of FIG. 1. Without the use of a mandrel, the weaving method and apparatus used in the formation of the bushing 10 of FIG. 1 will weave a substantially cylindrical braided layer generally indicated at 78. After the first layer of the braid has been woven a selected length about an axis 80, an outermost portion of the first braid layer is folded back over on itself, such that a second braid layer 82 is formed exterior to the first. This second braided layer is continuous and integral with the first and is joined therewith about a peripheral edge 84.

When the second back braid layer has a sufficient length, the weaving process is halted and a flange 86 is formed by folding or otherwise outwardly displacing a portion of the braided layers including peripheral edge 84. The size of the flange is dependent on the amount of braided layer displacement and can be adjusted according to the bushing application. As in the bushing 10 of FIG. 1, the woven braided layers with a flange forms a preform and can be processed with a rigidifying means such as a resin or other rigidifying means in a manner similar to that of bushing 10 of FIG. 1.

Unlike a single braid layer, a multiple braid layer which is continuous at a peripheral edge maintains the relative orientation of the strands during the flange formation process. The outer braid layer formed by back braiding not only provides additional strength but prevents distortion of the strands and loss of relative orientation during the flange formation process. For more strength, the braided layers may be woven with at least one strand substantially parallel to longitudinal axis of the bushing in the manner described hereinabove. In the bushing of FIG. 9, axial strands traverse the length of the braid layer 78, extend radially outward from and back toward axis 80 in the flange 86, and longitudinally traverse along braid layer 82.

Similarly, although the invention has been shown and described with respect to a preferred embodiment thereof, it should be understood by those skilled in the art that various other changes, omissions and additions thereto, may be made therein without departing from the spirit and scope of the invention.

We claim:

1. A method of making a flanged braided bearing having a hollow portion and a connected flange portion for guiding an associated first part for movement relative to a second part, said method comprising the steps of:

providing a mandrel having a longitudinal axis and having a cylindrical shank portion having a free end and an opposite end connected with a cylindrical shoulder portion;

arranging said cylindrical shank portion and said cylindrical shoulder portion concentrically about said mandrel longitudinal axis;

providing said cylindrical shoulder portion with a diameter broader than that of said shank portion such that said shoulder portion and said shank portion are interconnected with one another by a flat end surface extending radially outwardly and perpendicularly from said cylindrical shank portion;

weaving a plurality of strands over said mandrel to form a mandrel-bearing preform assembly by providing a plurality of axial strands and orienting each of said axial strands substantially parallel to said mandrel longitudinal axis along the outer surface of said cylindrical shank portion, orienting portions of each of said axial strands along said flat end surface radially outwardly relative to said mandrel longitudinal axis, providing a plurality of cross strands and weaving said cross-strands with said axial strands to form a continuous woven braid layer overlaying said cylindrical shank portion to form the portion of said bearing corresponding to said hollow portion, continuing weaving said cross-strands with said axial strands over said mandrel to thereby overlay said flat end surface with said woven braid layer to form the portion of said bearing corresponding to its flanged portion;

clamping said woven braid layer on said mandrel to maintain said axial strands in said orientations along said cylindrical shank portion and said flat end surface taken relative to said mandrel longitudinal axis;

impregnating said woven braid layer with a rigidifying means; and curing said rigidifying means while applying pressure to said woven braid layer to compress said mandrel-bearing preform assembly and cure it in such a manner so that said axial strands maintain their orientations relative to said mandrel longitudinal axis along the length of said cylindrical shank portion and including along said flat end surface extending between said cylindrical shank portion and said cylindrical shoulder portion to provide increased strength in the area of said bearing where the flange portion connects with said hollow portion.

2. A method according to claim 1 wherein said step of applying pressure to said woven braid includes a debulking step of pressing said mandrel-bearing preform assembly.

3. A method according to claim 2 wherein said mandrel-bearing preform assembly includes the steps of removing the mandrel from the debulked preform and trimming the debulked preform into a bearing.

4. A method according to claim 1 wherein said step of forming said mandrel bearing preformed assembly by weaving a plurality of strands over said mandrel further includes the step of weaving a second braid layer over a said woven braid layer in contact with said mandrel.

5. A method according to claim 1 wherein said step of impregnating said woven braid layer with a rigidifying means includes the steps of;

impregnating the preform with resin; and heating said impregnated preform to a selected temperature while applying said pressure for a selected period of time.

* * * * *